United States Patent [19]

Falk et al.

[11] Patent Number: 4,764,552

[45] Date of Patent: Aug. 16, 1988

[54] GRAFTED NITRILE RUBBER—PLASTICIZED PVC BLENDS AS THERMOPLASTIC ELASTOMERS

[75] Inventors: John C. Falk, Northbrook, Ill.; Leland B. Kliever, Randolph, Ohio

[73] Assignee: Borg-Warner Chemicals, Inc., Parkersburg, W. Va.

[21] Appl. No.: 933,956

[22] Filed: Nov. 24, 1986

Related U.S. Application Data

[63] Continuation-in-part of Ser. No. 585,078, Mar. 1, 1984, abandoned.

[51] Int. Cl.$^4$ ............................................. C08L 51/00
[52] U.S. Cl. .................................................... 524/504
[58] Field of Search ......................................... 524/504

[56] References Cited

FOREIGN PATENT DOCUMENTS 2061975  5/1981  United Kingdom ................ 524/504

Primary Examiner—Joseph L. Schofer
Assistant Examiner—N. Sarofim
Attorney, Agent, or Firm—Emily A. Richeson

[57] ABSTRACT

Compositions comprising grafted nitride rubber, PVC and plasticizer are good thermoplastic elastomers without vulcanization. These compositions exhibit good solvent and abrasion resistance and usually good resistance to compression set.

3 Claims, No Drawings

GRAFTED NITRILE RUBBER—PLASTICIZED PVC BLENDS AS THERMOPLASTIC ELASTOMERS

The present application is a continuation-in-part of application Ser. No. 585,078, filed Mar. 1, 1984, now abandoned.

BACKGROUND OF THE INVENTION

This invention relates to thermoplastic elastomer compositions comprising blends of graft copolymers, polyvinyl chloride (PVC) and plasticizers. The compositions require no curing or vulcanization to develop elastomeric properties. The compositions thus remain thermoplastic and can be repeatedly remolded or extruded.

The term "thermoplastic elastomer" has generally been applied to elastomers that can be readily processed and reprocessed by conventional melt processing equipment by virtue of the fact that such elastomers are not cured or vulcanized. The reprocessability of these elastomers compared with conventional cured or thermoset rubbers results in a great reduction in loss due to scrap, with consequent economic benefits for the processor. A variety of such materials have been introduced in recent years such as thermoplastic polyesters, styrene block copolymers, and thermoplastic olefin-rubber blends. Typical of such materials are the styrene-butadiene-styrene block copolymers sold as Kraton brand elastomers by the Shell Chemicals Co. and the Hytrel brand polyester elastomers sold by DuPont. Many of these elastomers have found wide application in consumer goods such as in shoe soling formulations and the like, as well as in such industrial applications as wire coating, hose and tubing, electrical connectors and automotive parts.

Currently available thermoplastic elastomers suffer some disadvantages in use. In particular, formulations based on olefinic resins including SBS block copolymers exhibit poor resistance to hydrocarbon solvents and low abrasion resistance which may limit their use in particular environments. Additionally, adhesion to dissimilar materials is poor, and a surface chlorination or other primer treatment is often needed to increase adhesive bonding between, for example, a molded shoe sole formed of such materials and a synthetic shoe upper. Primer treatment of the surfaces of molded goods is also needed where the part is to be painted, which further increases the production cost of such goods.

Nitrile rubbers or elastomers are essentially random, non-crystalline copolymers of 1,3-dienes and acrylonitrile containing from 15 to 50% acrylonitrile. These rubbers are widely available commercially and have long been used in the manufacture of oil-resistant gasketing, hoses and the like. As produced, nitrile rubbers are generally soft, low-strength thermoplastic gums that are soluble in or swelled by a variety of solvents. When compounded with reinforcing fillers and vulcanized, nitrile rubbers are tough useful elastomers with excellent oil and solvent resistance. The oil and fuel resistance of cured nitrile rubbers generally increases with increasing acrylonitrile level. However, the improved oil resistance is gained at some sacrifice in resilience and low temperature flexibility. Further, the vulcanizing or curing process results in highly cross-linked materials which are insoluble and intractable. The cured nitrile elastomers thus become thermoset and are no longer thermoplastic and readily reprocessable.

The modification of nitrile rubber stocks by adding PVC together with a conventional PVC plasticizer has long been practiced in the rubber compounding art. A minor proportion of PVC, usually less than 33 wt %, is used to impart increased sunlight and ozone resistance to nitrile rubber, together with improved abrasion and tear properties. Such formulations find use in wire and cable coverings and in the production of hose and tubing, as well as in shoe sole formulations. These blends are, for most applications, normally vulcanized to provide elastomeric character and therefore are not considered to be thermoplastic elastomers.

Oil-resistant thermoplastic elastomers comprising graft copolymers prepared by graft copolymerizing mixtures of monovinyl aromatic monomers and vinyl nitrile monomers in the presence of a nitrile rubber substrate have recently been disclosed. These compositions are thermoplastic elastomers without being vulcanized, and exhibit a high degree of oil resistance while retaining low temperature properties. For some applications, however, these materials exhibit an undesirably high level of shrinkage in molding and further formulation is required.

Thermoplastic elastomer formulations based on nitrile rubber graft copolymers would be a useful advance in the art. These graft copolymers are readily produced by a variety of well known and economical processes. As is well known, graft copolymers may be readily modified by varying the type and proportion of monomers used in their preparation to selectively improve such characteristics as abrasion and solvent resistance, adhesion, weatherability and the like. Elastomer formulations based on these graft copolyemrs could thus find application in the production of molded and extruded goods to meet a wide variety of environmental requirements including shoe soling, extruded hose and tubing, wire and cable insulations, the production of flexible cord, automotive parts and the like.

SUMMARY OF THE INVENTION

Compositions comprising blends of thermoplastic nitrile rubber graft copolymers, PVC and plasticizer are useful as thermoplastic elastomers. The compositions do not require vulcanization, exhibit a rubbery feel and appearance, have good resistance to compression set and may be melt-processed in convention molding and extrusion equipment.

DETAILED DESCRIPTION OF THE INVENTION

The thermoplastic graft copolymers useful in the practice of this invention are graft copolymers with a rubber substrate and a graft phase. The substrate consists essentially of one hundred parts by weight of a conventional nitrile rubber, i.e., a rubbery copolymer of a 1,3-diene and a vinyl nitrile, and the graft phase consists essentially of from 10 to 100, preferably from 30 to 70 parts by weight of a copolymer of a monovinyl aromatic monomer and a vinyl nitrile monomer. The graft copolymer also may be characterized as a high-rubber graft copolymer having from 60 to 80 wt % rubber substrate, and, correspondingly, from 40 to 20 wt % grafted superstrate copolymer.

The nitrile rubber component useful as the substrate in preparing the nitrile rubber graft copolymers may be any of the conventional random, non-crystalline rubbery copolymers of a 1,3-diene such as butadiene or isoprene with acrylonitrile or methacrylonitrile. Typically, such copolymers will comprise from 85 to 50 wt % diene and from 15 to 50 wt % acrylonitrile. The preferred nitrile rubbers are those prepared in emulsion polymerization processes and containing greater than 40 wt % 1,3-butadiene and, correspondingly, less than about 40 wt % acrylonitrile, and most preferred are those containing less than about 30 wt % acrylonitrile. The toluene-insoluble gel content of these nitrile rubber laticies is low, typically less than 60%.

The graft phase or superstrate component will comprise a monomer mixture of vinyl aromatic monomers such as styrene, vinyl toluene, alpha methylstyrene and the like and mixtures thereof, and vinyl nitrile monomers such as acrylonitrile, methacrylonitrile and mixtures thereof. The graft polymerization may be carried out by a conventional emulsion or suspension free radical graft polymerization process. However, the preferred method for preparing oil-resistant thermoplastic elastomers will be the emulsion graft polymerization of the graft phase monomer mixture in the presence of a preformed latex of the substrate nitrile rubber, employing conventional free radical or redox polymerization catalysts such as cumene hydroperoxide, dicumyl peroxide or the like together with activators, or alkali metal persulfate initiator systems.

PVC resins useful in the practice of this invention include homopolymer is of vinyl chloride and copolymers of vinyl chloride containing up to 20 wt % of copolymerizable monomers such as vinylidene chloride and the like. Methods for preparing the PVC polymers are also well known and such resins are widely available commercially in a variety of molding and extrusion grades.

The plasticizers useful in the practice of this invention include any of the plasticizers commonly used in the art with vinyl chloride resins. Typical plasticizers include ester plasticizers such a dialkyl phthalates and the like and the phosphate plasticizers such as tri(alkylphenyl)-phosphates and the like, as well as a wide variety of plasticizers based on vegetable oils such as expoxidized soyabean oil and the like.

The composition of this invention comprises 100 pbw PVC resin, from 40 to 250, preferably from 50 to 200 parts by weight of nitrile rubber graft copolymer, and from 80 to 120, preferably from 95 to 110 parts by weight of a PVC plasticizer. The compositions may be prepared by any of the conventional rubber compounding techniques including dry blending the components then melt processing in a compounding extruder or on a two-roll mill. Alternatively the components may be mixed in batch melt mixing equipment such as a Banbury mixer or the like. The compositions may then be further extruded or injection molded in conventional ram- or screw-injection molding machines to form extruded or molded goods.

The compositions of this invention may further include antioxidants, stabilizers, fillers, pigments, extenders, secondary plasticizers, flame retardants, dyes and the like as is commonly practiced in the rubber compounding art.

The practice of this invention may be better understood through consideration of the following examples, which are provided by way of illustration of the invention and not in limitation thereof.

In the examples, the following terms are employed:
Tensile Str=tensile strength at room temperature, ASTM D638
E=elongation at break, ASTM D638
Hardness=shore hardness, ASTM D2240, A range
Taber Abr=Taber abrasion, loss in grams/1000 cycles
Vol Swell=volume swell on exposure to indicated solvents at the indicated temperature for 24 hours
Comp Set=compression set at indicated temperature 22 hours, ASTM D395
Elast Rec=Elastic Recovery, determined by extension at 100% for 1 min, releasing and measuring after 60 seconds

EXAMPLE 1

Preparation of Nitrile Rubber Substrate

Potassium soap of tallow fatty acid (2780 g of a 10%-wt aqueous solution), potassium persulfate (27.8 g), t-dodecyl mercaptan (69.4 g), water (16000 g), acrylonitrile (2780 g), and butadiene (6936 g), were changed to a 10 gal pressure reactor. The mixture was heated to 40° C. and held at this temperature with stirring until a monomer conversion of 95% or higher was reached (approximately 8.5 hr.). After cooling to 25° C., the NBR latex was drained from the reactor. The NBR obtained contained 21.5% acrylonitrile. The solids content of the latex was 31%.

EXAMPLE 2

Preparation of Nitrile Rubber Graft Copolymer

A portion of the NBR latex (6000 g) of Example 1 was diluted with water (3750 ml). To this latex were added cerelose (7.41 g), tetrasodiumpyrophosphate (0.741 g), ferrous sulfate heptahydrate (0.0988 g) and t-dodecylmercaptan (11.5 ml). The latex mixture was then charged to a 5 gal flask equipped with stirrer and heated at 60° C. under nitrogen flow. A mixture of styrene-acrylonitrile (1235 g, wt ratio styrene/acrylonitrile=7.33/1) and cumene hydroperoxide (7.4 ml, 83% active) was pumped into the flask over a period of ½ hr. After 10 min pumping time, the temperature was increased from 60° to 70° C. over a period of 20 min. After completing the addition, the reaction mixture was heated an additional 2.5 hours at 74° C. After addition of 17 ml N,N-diethyl-hydroxylamine and 165 ml of an antioxidant emulsion (25% active), the latex was cooled to ambient temperature and coagulated with aqueous alum solution. The graft copolymer obtained, which had a rubber content of 60 wt %, was isolated by centrifugation and dried in a vacuum oven at 70° C. overnight. Test specimens were injection molded on a Battenfeld 1 oz. injection molding machine, at a stock temperature of 350° F. using a ram pressure of 1000–1300 psi and a mold temperature of 70°–100° F. The test specimens exhibited the following properties: tensile strength, 930 psi; elongation, 280%, permanent set at break, 25%; volume increase after 24 hr immersion; 1% in ASTM #3 oil; 4% in Ref. Fuel A, 68% in Ref. Fuel B.

EXAMPLES 3-6

In the following examples 3-6, compositions were prepared by compounding the formulations on a two-roll mill at 350° F., sheeting out the compositions and cooling to room temperature. The compositions were then cut into strips and injection molded on a 1.0 oz Battenfeld reciprocating screw machine, using barrel temperatures in the range 280°–300° F. and a mold temperature of 100° F. to form test specimens. The formulations and the physical properties are summarized in Table I.

TABLE I

| Example No.: | 3 | 4 | 5 | 6 |
|---|---|---|---|---|
| Composition: | | | | |
| Graft Polymer, pbw | 0 | 50 | 200 | 100 |
| PVC pbw | 100 | 100 | 100 | 0 |
| Plasticizer pbw | 83 | 100 | 118 | 19 |
| Stabilizer pbw | 3.3 | 3.75 | 2.5 | 0 |
| ODPP pbq | 3.3 | 3.75 | 2.5 | 0 |
| Properties: | | | | |
| Tensile Str, psi | 1200 | 1010 | 740 | 560 |
| E % | 180 | 200 | 255 | 250 |
| Hardness, Shore A | 62 | 62 | 65 | 57 |
| Taber Abr, g/Kc | 0.21 | 0.24 | 0.33 | 0.32 |
| Vol Swell, 70 hr | | | | |
| ASTM #3, 212° F. | −19 | −11 | 3.8 | 22 |
| Fuel B, RT | 6.2 | 18 | 38 | 56 |
| Comp Set, %/22 hr | | | | |
| Rt | 22 | 24 | 34 | 51 |
| 158° F. | 72 | 63 | 45 | 65 |
| 212° F. | 87 | 74 | 55 | 54 |

Notes:
Graft Copolymer = 40 wt % SAN grafted onto nitrile rubber substrate; see Example 2
PVC = Polyvinylchloride, obtained as Geon 103 EP F76 from B. F. Goodrich Co.
Plasticizer = Dioctylphthalate
Stabilizer = Mark 1900 barium-lead soap from Argus Chemicals Co.
ODPP = Diphenylisoctylphosphite from Borg-Warner Chemicals, Inc.
For testing definitions, see text.

It will be apparent that the compositions of this invention, Examples 4 and 5, exhibit good tensile strength and abrasion resistance, as well as useful solvent resistance. Surprisingly, the compression set characteristics of these compositions, particularly at elevated temperatures, is considerably better than either of the control blends, Examples 3 and 6. The compositions of this invention are thus tough, durable thermoplastic elastomers.

It will be recognized by those skilled in the art that further modifications may be made in the graft copolymer component and in the base formulation to emphasize and enhance particular physical properties such as solvent resistance, hardness and abrasion resistance through use of a different proportion of the grafting monomers, rubbery substrates having different levels of nitrile monomer, different proportions of PVC and plasticizer, and selection of plasticizers as may be needed for a particular end-use. The compositions of this invention thus provide the compounder with a great degree of flexibility in meeting the requirements for use in a variety of widely differing applications.

It will be seen that this invention is a composition comprising 100 pbw PVC, 40 to 250, preferably from 50 to 200 parts by weight of a nitrile rubber graft copolymer, and from 80 to 120, preferably from 95 to 110 parts by weight PVC plasticizer. The preferred nitrile rubber graft copolymers may further be described as comprising from 30 to 70 parts by weight of a graft phase formed of a mixture of monomers comprising vinyl aromatic monomers such as styrene and alpha methylstyrene, acrylic monomers such as methylmethacrylate and vinyl cyanide monomers such as acrylonitrile, and 100 parts by weight of a nitrile rubber substrate, defined as a rubbery copolymer of from 85 to 50 wt % 1,3-diene monomer and from 15 to 50 wt % acrylonitrile, preferably less than 40 wt % acrylonitrile.

The compositions are useful as thermoplastic elastomers in formulating molded and extruded consumer goods such as in shoe soling compositions, adhesives, hose and tubing and the like. As will be recognized by those familiar with the rubber compounding art, these compositions may further comprise additional thermoplastic resins, as well as antioxidants, stabilizers, dyes, pigments, flame retardants, fillers, processing aids, extenders, secondary plasticizers and the like as needed for particular uses, and such further additions and modifications are thus contemplated as within the scope of the invention.

We claim:
1. A composition consisting of:
   (a) 100 parts by weight of a PVC resin;
   (b) from 40 to 250 parts by weight of a nitrile rubber graft copolymer, said graft copolymer including from about 40 to 20 wt. % graft phase and from about 60 to 80 wt. % rubber substrate such that:
      (i) said graft phase is derived from a monomer mixture consisting of vinyl aromatic monomers and vinyl nitrile monomers; and
      (ii) said rubber substrate is a nitrile rubber; and
   (c) from 80 to 120 parts by weight of a plasticizer for PVC resins;
   such that said composition is a thermoplastic elastomer.

2. The composition of claim 1 wherein the nitrile rubber graft copolymer is a graft copolymer consisting of:
   (a) from 30 to 70 parts by weight of a mixture of styrene and acrylonitrile containing up to 40 wt % acrylonitrile, said mixture graft polymerized in the presence of
   (b) 100 parts by weight of a preformed nitrile rubber.

3. The composition of claim 2 wherein said nitrile rubber is a copolymer comprising from 5 to 40 wt % of acrylonitrile and correspondingly from 95 to 60 wt % of a 1,3-diene.

* * * * *